United States Patent [19]

Grimberg et al.

[11] Patent Number: 4,520,442

[45] Date of Patent: May 28, 1985

[54] DIGITAL DATA PROCESSING AND STORAGE SYSTEM ESPECIALLY FOR A TOMODENSITOMETER, AND A TOMODENSITOMETER EQUIPPED WITH SAID SYSTEM

[75] Inventors: Martine Grimberg; Alain Berard, both of Paris, France

[73] Assignee: Thomson-CSF, Paris, France

[21] Appl. No.: 279,628

[22] Filed: Jul. 1, 1981

[30] Foreign Application Priority Data

Jul. 4, 1980 [FR] France .............................. 80 14909

[51] Int. Cl.³ .............................................. G06F 15/42
[52] U.S. Cl. .................................... 364/414; 364/900; 378/901
[58] Field of Search ............... 364/414, 200, 900, 724; 378/920

[56] References Cited

U.S. PATENT DOCUMENTS

| 3,924,129 | 12/1975 | Le May | 250/336 |
|---|---|---|---|
| 3,975,714 | 8/1976 | Weber et al. | |
| 4,135,247 | 1/1979 | Gordon et al. | 364/414 |
| 4,160,906 | 7/1979 | Daniels et al. | 364/414 |
| 4,228,517 | 10/1980 | Constant | 364/724 |
| 4,231,097 | 10/1980 | Shibayama et al. | 364/414 |
| 4,320,453 | 3/1982 | Roberts et al. | 364/200 |
| 4,366,535 | 12/1982 | Cedolin et al. | 364/200 |

FOREIGN PATENT DOCUMENTS 2001502  1/1979  United Kingdom .

OTHER PUBLICATIONS

Electro Conference Record, vol. 4, No. 8/5, 24–26 Apr. 1979, Los Angeles, Karwoski: "Architecture Development for a General Purpose Digital Filter", pp. 1–16.

Primary Examiner—Gary Chin
Attorney, Agent, or Firm—Roland Plottel

[57] ABSTRACT

The system comprises a central unit, a data acquisition system, a memory control device and a processing device which is decentralized with respect to the central unit. The invention has the advantage of preventing continuous operation of the control device during processing of the data of the memory and especially of permitting interlace processing of the different pages of the memory.

5 Claims, 6 Drawing Figures

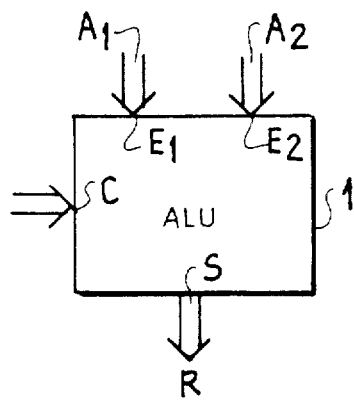
FIG_1 PRIOR ART
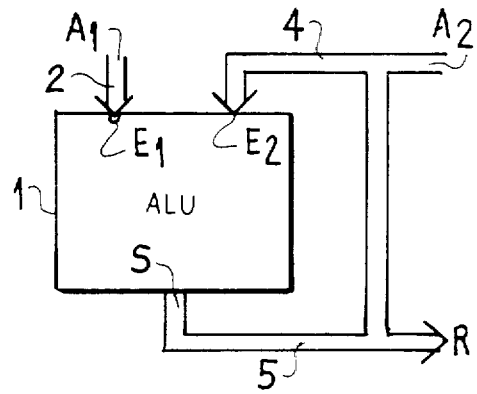
FIG_2 PRIOR ART
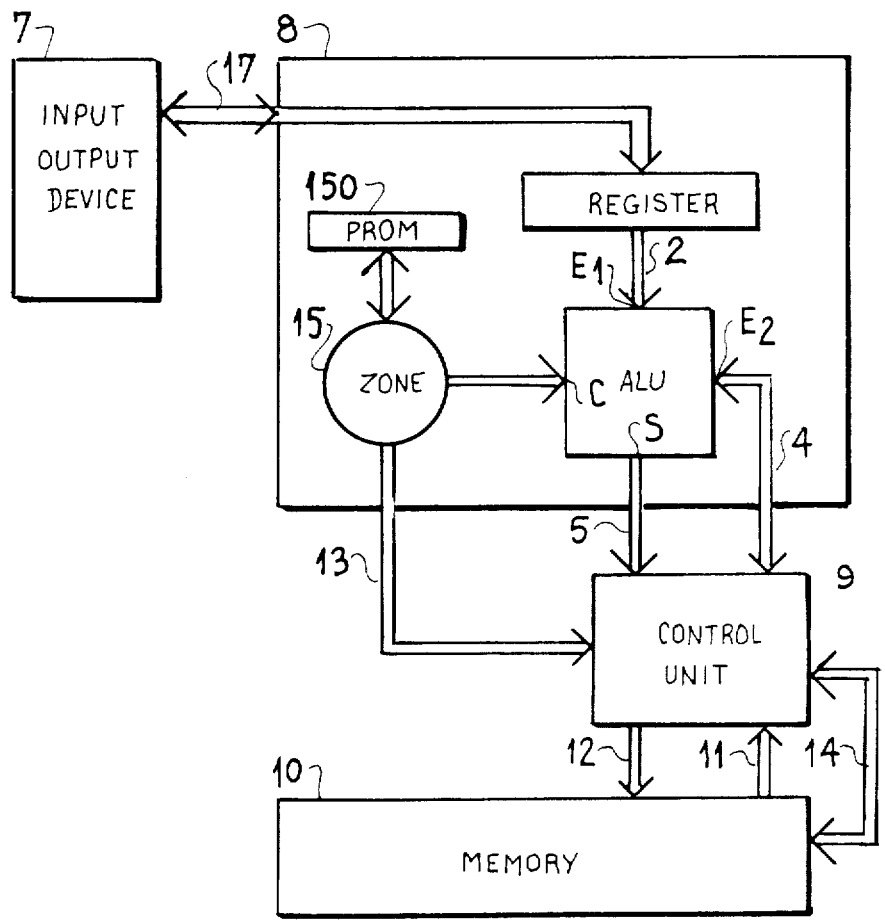
FIG_3 PRIOR ART

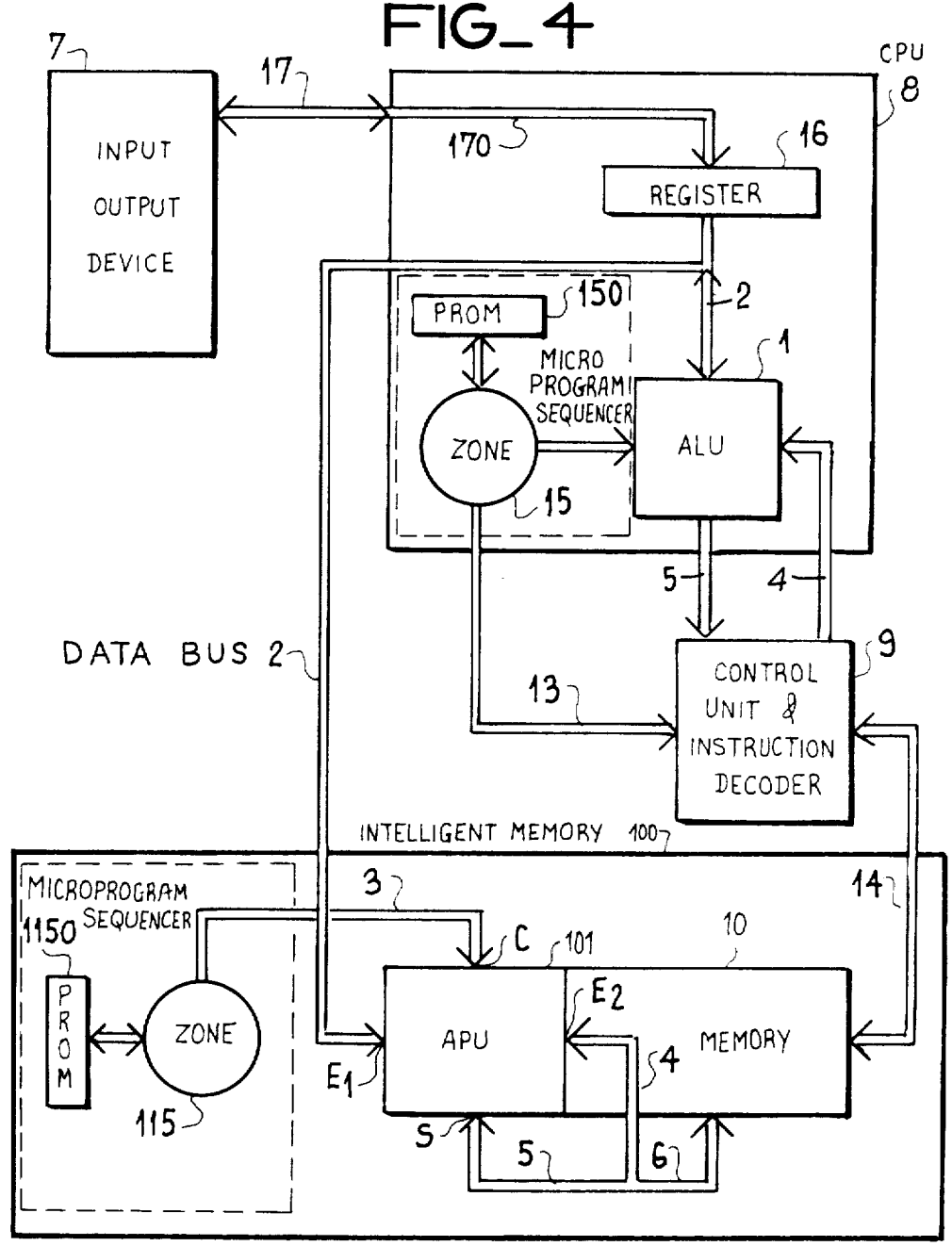

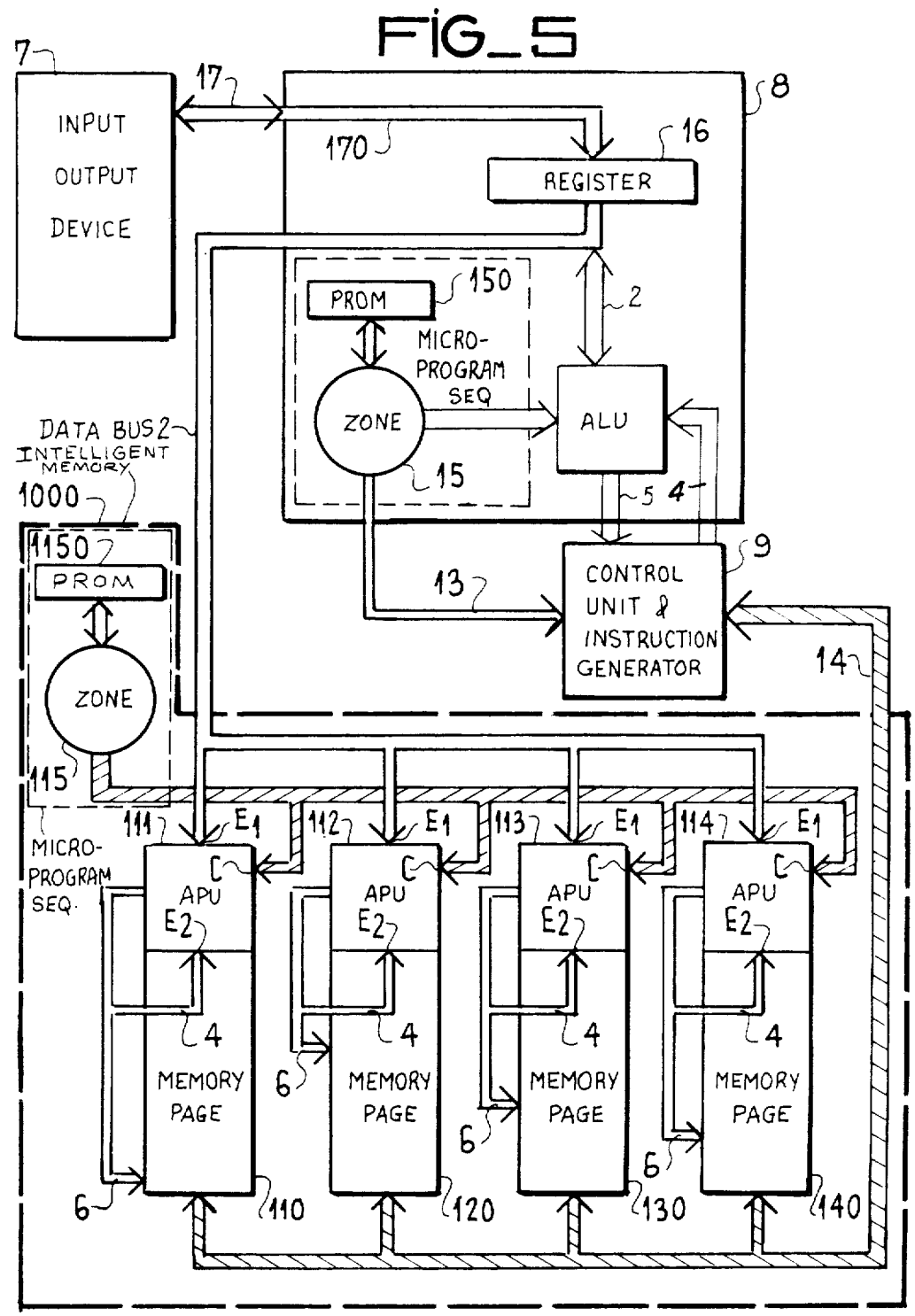

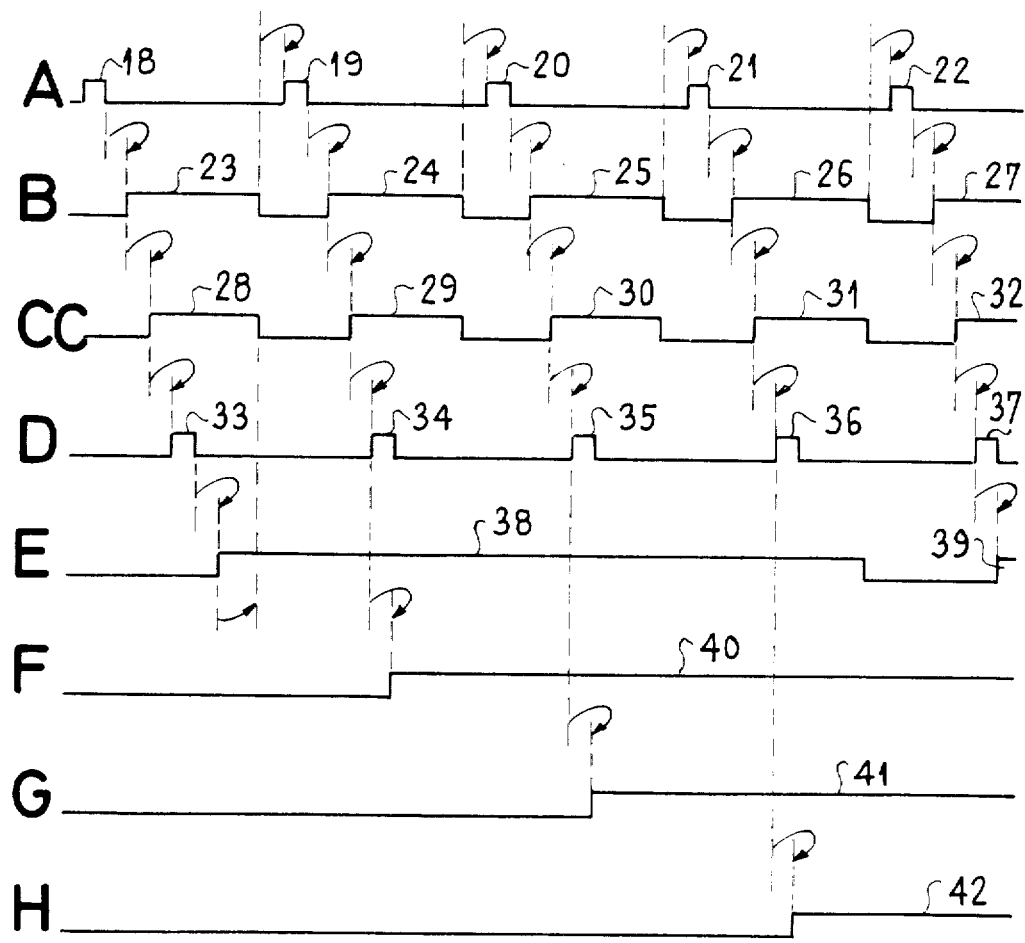
FIG_6

DIGITAL DATA PROCESSING AND STORAGE SYSTEM ESPECIALLY FOR A TOMODENSITOMETER, AND A TOMODENSITOMETER EQUIPPED WITH SAID SYSTEM

This invention relates to a system for processing and storing digital data, especially for a tomodensitometer.

Assemblies for processing digital data in the form of binary elements are already known in the prior art. Under the general designation of computers, assemblies of this type may include memory or storage devices. Depending on the degree of specialization, these assemblies may also be referred to as digital data processors and can also be provided with memory or storage circuits. This invention relates more specifically to digital data processors which are especially adapted for the handling of considerable masses of data. For example, the invention applies to processors which are used to process radiological data for reconstruction of tomodensitometric images. Many different types of data-processing applications come within the scope of the invention, including spectral analysis of real-time processing.

In the prior art, data-processing systems have been described by a considerable number of specialists in the areas of interest just mentioned. The present invention provides a novel solution to the question of optimization of timing diagrams, especially in the field of real-time data-processing.

According to a further aspect, this invention provides a novel processor design which is particularly advantageous for reconstruction of tomodensitometric images.

Accordingly, the present invention is directed to a digital data processing and storage system comprising a central unit, a control device and a data storage device connected by service lines, and input-output devices. The system is distinguished by the fact that the storage device is associated with a processing device under the sequential control of a control and addressing assembly which thus constitutes an intelligent memory.

These and other features of the invention will be more apparent upon consideration of the following description and accompanying drawings, wherein:

FIG. 1 is a constituent element of the prior art and also of the system according to the invention;

FIG. 2 is a constituent element in a particular configuration;

FIG. 3 shows a computer configuration according to the prior art;

FIG. 4 shows a computer configuration according to the invention;

FIG. 5 shows an alternative embodiment according to the invention;

FIG. 6 is a timing diagram relating to the operation of the alternative embodiment of FIG. 5.

Processing of data by means of a digital data processor consists in applying data sets to a processing device. This device can comprise a certain number of arithmetic/logic units or so-called operators which perform the elementary processing operations. An operator has a number N of inputs E1, E2, ... EN, at least one output S and one control C. Said operator performs an operation f defined by the relation R:f (A1, ..., AN, C), where A1, ..., AN are data presented at the inputs E1, ..., EN and R is a result which is present at the output S after application of the control C. During and at the end of the process, the results are directed to a storage device which serves either as a temporary store such as register during processing or as a permanent store such as a mass-memory unit for subsequent processing. It would be possible in this case to contemplate the use of a visual display device, for example.

The blocks which will now be described refer simultaneously to the corresponding devices, therefore on the one hand to physical entities and on the other hand to the functions which they tend to perform.

In FIG 1, there is shown a two-data operator which satisfies the equation:

$$R = f(A1, A2, C)$$

The operator 1 comprises the two inputs E1 and E2, the output S and the control C. The data A1 and A2 are presented at the corresponding inputs. At the control C, the result R appears at the output S. The data A1 and A2 can consist, for example, of a word sequence $a_1, a_2, \ldots a_p$ in respect to the data A1 and of a word sequence $b_1, b_2, \ldots b_p$ in the case of the data A2. At each control and after each presentation, the step j of the process f will correspond to a condition in which the following equation is satisfied:

$$r_j = f(C, a_j, b_j)$$

where $r_j$ will be the $j^{th}$ result R obtained on the output S. The type of operator considered can have a programmable structure. The control word C is accordingly constituted by a series or parallel sequence of microinstructions emitted for example by a central device such as an arithmetic-logic unit (ALU).

If the process involves q operators which perform the operations $f_1, f_2, \ldots f_q$, the number operator number k may receive as inputs the result R of the operator number k−1 which precedes this latter and at least one other data. For the sake of enhanced clarity, the remainder of the description will be limited to one process with a single operator 1 for performing the operation f.

A particular type of process is the repetitive process. This method of data-processing consists in repeating at least one operation of the process a predetermined number of times. Thus a sequence of input data is delivered to the operator which carries out a repetitive process by re-introducing at least a certain number of intermediate results to the input. One repetitive process which is more particularly worthy of note when it is necessary to combine the results immediately preceding the input data item or items is the so-called recursive process which consists in satisfying the two following relations:

$$b_j = r_{j-1}$$

$$r_j = f(a_j, b_j, C)$$

In order to carry out this processing operation, FIG. 2 shows an operator 1 with its inputs E1, E2, the control C and the output S. The operator further comprises the service lines 2, 3 and 4, the line 2 being intended to supply the data A1, the line 3 being intended to supply the control C and the line 4 being intended to supply the data A2. As will be observed, line 4 is connected to the output S via a bypass 5. The service line 4 is bidirectional.

When the process is initialized, the first word $a_1$ of the data A1 and the first word $b_1$ of the data A2 are brought to the inputs E1 and E2 via the lines 2 and 4. When the control C is applied to the line 3, the result $r_1$ is caused to appear (subject to the transit time), this being the first result R on the line 5. The following equation has thus been satisfied:

$$r_1 = f(a_1, b_1, C)$$

The loop formed by the lines 4 and 5 indicates that the data item which is present at the input E2 has now become $r_1$. The second step of the process therefore effectively carries out the operation:

$$r_2 = f(a_2, b_2, C)$$

$$b_2 = r_1$$

At the $p^{th}$ and last step of the repetitive process, we obtain:

$$r_p = f(a_p, b_p, C)$$

$$b_p = r_{p-1}$$

The loop formed by the lines 4 and 5 comprises an output 6 which makes it possible to obtain the result of the repetitive process $r_p$. There has thus been achieved the processing of one data word $b_1$ per p data words A1 which are $a_1, a_2, \ldots a_p$ and the final result is $r_p$ which is available on the output line 6.

In the prior art, processing operations of this type are well-known. But it will be noted in the configuration described that the arrangement of conventional processors is not advantageous. FIG. 3 is in fact a diagrammatic illustration of a processing and storage system in accordance with the prior art.

The processor of FIG. 3 comprises a central processing unit (CPU) 8 connected to an input-output device 7 by means of a service line 17. The central unit 8 comprises an operator 1 which receives data words on the one hand from a register 16 via a service line 2 and on the other hand from a memory 10 via a control device 9.

The control C and the control of said device 9 are generated by a zone 15 of the central unit 8.

Sequencing of the different operations is carried out by means of a program previously recorded in a memory 150 of the PROM type, for example. Under the control of a particular element (not shown) of the processor, said memory 150 is intended to constitute a microprogram sequencer in conjunction with the zone 15. The following task is performed by the processor, assuming that it is desired to carry out the process:

$$R = f(A1, A2, C)$$

by means of the operator 1. To this end, the zone 15 first generates a control order which is transmitted to the control device 9 via the line 13. After decoding, this order will generate an address which is transmitted to the memory 10 via the line 14 and will also indicate the reading order to said memory. The data word corresponding to the data A2 is then transmitted via the service line 11 to the control device in which it undergoes a reshaping operation and is then presented at the input E2 via the line 4.

During the same period of time, the data word of the register 16 is transmitted by the central unit 8 via the line 2 to the input E1 in which it is employed as argument A1. The zone 15 then emits the processing control C on the line 3. The operator 1 performs the operation f and the result R appears at the output S on the line 5. Said result is transmitted to the control device 9 while the zone 15 generates a control order in order to generate the address word in which the result word R will be written. The zone 15 also generates the WRITE instruction and the result word R which has previously been reshaped in the control device 9 is stored in the memory 10 via the line 12. In the case of a recursive processing operation, the cycle must be performed p times, which may preclude the possibility of real-time processing.

Provision can be made for a plurality of computation units having a design which is identical with that described in the foregoing. By way of example, an arrangement of this type will be found in U.S. Pat. No. 4,135,247 to Gordon. The increase in the number of data to be processed in real time makes a device of this type inoperative. In particular, since all the operations involved in the process do not have the same time-duration, provision must accordingly be made for buffer devices in order to transmit the data.

The processing and storage system which is contemplated by the invention and presented in FIG. 4 in a recursive-processing configuration makes it possible to overcome the major drawback mentioned above. This system accordingly comprises an additional operator 101 which is decentralized with respect to the central unit 8. This configuration makes it possible to avoid the need for back-and-forth transfer of the data delivered by the memory 10 via the control device 9 and in particular to achieve an appreciable saving of time.

The system in accordance with the invention comprises the same assemblies 7, 8, 9 and 10 as conventional processors. The operator 101 is directly connected with the memory 10.

Said memory 10 is accordingly associated with the assembly consisting of zone 115 and memory 1150 which is similar to the assembly consisting of zone 15 and memory 150 of the central unit 8 and performs the same function in the case of the operator 101. The assembly just mentioned (15, 150) of the central unit 8 makes it possible to program other processes for example on the hereinabove described operator 1 which forms part of the central unit 8. The association of the assembly (115, 1150), of the operator or auxiliary processing unit 101, of the memory 10 and of their service lines constitutes an intelligent memory 100. This memory is provided with only two conversational accesses to the remainder of the processor, namely the input line 2 for the data to be processed and stored by the intelligent memory 100 and the line 14 which serves in particular to initialize the memory 10. Said line 14 may in any case be dispensed with when all the values are initialized by internal controls of the memory 10 which are either "clear" or "preset". the CPU 8 only has to initiate the order for the beginning of the processing operation. The intelligent memory 100 can then operate independently, thus feeding the central unit 8 which can then be assigned to more complex tasks. This process-initiation order as well as sequencing of the assembly (115, 1150) can be decoded from the flow of data in line 2.

In the particular case of tomodensitometric image reconstruction, the input/output device 7 is a radiological data acquisition system h. The set of radiological null. Through the intermediary of the assembly 15, 150, the central processing unit 8 is intended to generate only the clear or reset order which is general according to the type of memory employed.

The timing diagram of FIG. 6 comprises eight diagrams which represent the state of the functions:
generation of addresses: diagram A,
generation of A2: diagram B,
generation of A1: diagram CC,
generation of control word C: diagram D,
operation on 111: diagram E,
operation on 112: diagram F,
operation on 113: diagram G,
operation on 114: diagram H.

The central unit 8 generates the order for initialization of the intelligent memory 1000. AT the same time, the first address relating to the first data item A2 is emitted on the line 14 by the zone 115 and memory 1150 during the time interval or width of the square-topped wave 16 of the diagram A. With due allowance for a switching time interval, the memory 1000 selected at its page 110 presents the data A2 on the input E2 of the operator 111 via the lines 4 and 6. While the first data item $b_1$ of the data A2 is presented, the register 16 emits on the line 2 the first data item $a_1$ of the data A1 relating to the address considered.

These two operations are performed during the time-width of the square waves 23 of the diagram B and 28 of the diagram CC. These latter are suitably held in order to be taken into account by the operator 111. During this holding time, said operator receives the corresponding control word C. This word can be made up of a number of binary elements which are variable as a function of the nature of the operation, of the step of the recurrent process and so forth. This operation is represented at the level of the square wave 33 of the diagram D.

The control word C initiates the performance of the operation on the operator 111 (square wave 38 of the diagram E). During the time-width of said square wave, it is possible to address a certain number of other memory pages. In the example described, there exist three other memory pages 120, 130 and 140 the number of which depends on the relative slowness of the operator employed. The general effect, however, is the same as if the master computer had only high-speed addressing capability.

After the rise of the square wave 38, provision must be made for a relaxation time interval. Thereupon, the second address to be processed by the second page 120 is generated (square wave 19 of the diagram A) and validates the page 120. The same sequence as the one described earlier is initiated and comprises the square waves 24, 29, 34 and 40 of the diagrams B, CC, D and F. Throughout this period of time, the operator 111 of the page 110 continues its work. Finally, the third page 130 (square waves 20, 25, 30, 35 and 41 of diagrams A, B, CC, D and G) and the fourth page 140 (square waves 21, 26, 31, 36 and 42 of diagrams A, B, CC, D and H) are addressed and validated by the assembly 115, 1150. The first cycle or initial cycle of the recursive interlace process is completed. After a holding time interval, the second cycle may then begin.

In order to operate in the manner described in the foregoing, the intelligent memory 1000 must comprise means (not shown) for counting the processing data A1 which are fed to said memory. In the example described, the assembly 115, 1150 may perform this function. This assembly must be provided with a scale-of-four counter which distributes the data to the different pages in accordance with the cycle described. Furthermore, the assembly must also be provided with a scale-of-p counter if the recursive process comprises p stages at each address. Thus the memory 1150 has memory address sequences in relation on the one hand to the memory page interlace cycle and on the other hand to the distribution of the data A1 fed to the memory 1000 from the register 16 via the line 2. It is this flow of data which controls the speed of the assembly 115, 1150.

In the second cycle, another function again comes into action, namely the function which consists in writing the result of the previous step in memory at the same address and in reading the result in order to present it as a fresh data 12 (in accordance with the principle of recursive processing). In the diagram A, the square wave 22 serves to address the page 110 and to validate the first processing address. Between the trailing edge of the square wave 38 (diagram E) and the leading edge of the square wave 27 (diagram B), the result at the output of the operator 111 is directed to the suitable address of the page 110 via the line 6, then to the square wave 27 which is presented at the input E2 as a data item a of the data A2. At this date, the first address of the memory 1000 has alone been modified. Since the data item $b_2$ of the data A1 has been presented at the square wave 32 (diagram CC), the control at the square wave 37 initiates the second operation on the operator 111 (square wave 39).

The interlace processing operation continues. At the $p^{th}$ and at last processing cycle, only four memory addresses have been suitably processed. No other address has yet been modified. The assembly 115, 1150 can then generate a further series of four memory addresses in order to continue the processing operation.

Finally, when all the addresses have been processed, the memory 1000 contains the entire reconstructed tomodensitometric image in the example described. The central unit 8 or like suitable device is then permitted via the control device 9 to initiate sequential reading of the memory 1000 for the purpose of visual display in accordance with television standards.

The data in memory 1000 can also be transferred to a recording unit such as flexible disks or magnetic tapes in order to constitute files. The central unit 8 is also capable of performing other subsequent processing operations including, for example, graphic operations such as color coding, three-dimensional representation, and so on.

Depending on the technologies employed, it will be necessary to provide the system with registers for presenting each value at the inputs and outputs of the memories. In the example herein described, there have been presented only those elements which can be adopted in a broad range of different electronic technologies. In particular, the form of the chronogram of FIG. 6 may change according to the particular technology under consideration.

In a more general manner, the data process may entail the need for a different number of operations. In such a case, a processing device may be constituted by a microprogram system, for example. The processing device is therefore a complex operator 1.

Finally, when the process involves only a small number of data, the memory may be replaced by the internal registers of the ALU of the central unit.

data constitutes the sampling of a function h defined by:

$$h(x, y, z) = \int_T f(s)ds$$

The integral is taken on a path T which is taken from a set and f is the radiological point density function at one point of said path.

The convolution method, developments of which will be found in the article by Ramachandran: "Three-dimensional reconstruction from radiographs and electron micrographs", in Proc. Nat. Acad. Sci. USA, vol 68, No 9, p. 2236-2240, Sept. 1974, provides two relations which are:

$$g(nb,\theta) = \frac{1}{4b} h(nb,\theta) - \frac{1}{b^2} \sum_{p \text{ odd}} \frac{h[(n+p)b,\theta]}{p^2} \quad (1)$$

$$f(jb, k\phi_o) = \sum_{t=1}^{n} g[jb \cos(k\phi_o - t\theta_o), t\theta_o] \quad (2)$$

These two basic relations are calculated directly from radiological data h provided by the data-acquisition system 7. The terms b, $\phi_o$ and $\theta_o$ are defined by the convolution method itself. The invention is more particularly advantageous for the purpose of carrying out the processing operation (2). Within the register 16, there are placed p numbers g[jb cos (k$\phi_o$−t$\theta_o$), t$\theta_o$]with t varying from 1 to p. These p numbers constitute the data word sequence $a_1, a_2, \ldots a_p$ of the argument A1. It is ensured that an initial argument $b_1$ which is identical with O:

$$b_1 = O$$

is present within the memory 10 at the address ADR in relation with the polar coordinates (jb, k$\phi_o$). It is then possible to carry out the repetitive process which consists in producing an accumulation of data words. The operator is an adder (or subtracter) according to the control C.

The zone 115 then addresses ADR, which is the position of the memory 10 concerned. The first data word $a_1$ which is as follows:

$$a_1 = g[jb \cos(k\phi_o - \theta_o), \theta_o]$$

is presented at the input E1. The first value of the data A2 is presented at the input E2 and is as follows:

$$b_1 = O$$

The first step of the process is:

$$r_1 = a_1 + b_1$$

whence
$$r_1 = g[jb \cos(k\phi_o - \theta_o), \theta_o]$$

The following equation is then satisfied $$b_2 = r_1$$

by presenting $r_1$ at the input E2. The register 16 provides the second word of the data a1 which is:

$$a_2 = g[jb \cos(k\phi_o - 2\theta_o), 2\theta_o]$$

and we obtain at the command C:

$$r_2 = g[jb \cos(k\phi_o - \theta_o), + g[jb \cos(k\phi_o - 2\theta_o), 2\theta_o]$$

In the case of the next step, the following condition is satisfied:

$$b_3 = r_2$$

and the operation is repeated until depletion of the data A1. We then have:

$$r_p = \sum_{t=1}^{p} g[jb \cos(k\phi_o - t\theta_o), t\theta_o]$$

The final result, $r_p$, is then addressed to that position of the memory 10 which is ADR. This address is in relation with the geometrical position (jb, $k_o r_p$) which accordingly represents the computed value of f(jb, $K_o r_p$). This value constitutes on the one hand the absorption density at the point (jb, $k_o r_p$) in the body section in the plane z and on the other hand the brightness or luminosity of that point of the tomodensitometric image display screen which is designated as a pixel.

The algorithm indicated here is a parallel-beam algorithm. In a fan-beam, it is necessary to carry out a change of variables and of integration domains. The final image-reconstruction calculation is not really modified.

The invention is particularly well-suited to processing of a large number of data and especially to real-time processing.

A particular alternative embodiment of the invention permits memory interlace operation. An operation on four memory pages is shown in FIG. 5. The memory 10 in fact comprises four memory pages 110, 120, 130 and 140. One auxiliary processing unit (APU) 111, 112, 113 or 114 respectively corresponds to each page. In order to ensure enhanced clarity of the figure, the service lines reserved for orders and addresses are shaded in diagonal lines or hatchings. The four memory pages 111, 112, 113 and 114 are connected in the same manner as the memory 10 in FIG. 4. In conjunction with the microprogram sequence 115, 1150, said four memory pages constitute a four-page intelligent memory 1000. The delay time in each APU is turned to profitable account in order to address and deliver a data word A1 to the other successive APU's.

The preferred mode of operation of the system shown in FIG. 5 is a recursive process. This mode wil be more readily understood with reference to the chronogram of FIG. 6.

The system according to the invention is in fact made up of two assemblies:
 a first assembly comprising the data-acquisition device 7, the central processing unit 8, the control device 9,
 a second assembly constituted by the intelligent memory 1000.

Said intelligent memory has two unidirectional service lines, namely the line 2 and the line 13, 14 which permit transmission only of the processing data A1 and A2 and the memory addresses.

In the example of construction herein descirbed, the line 13, 14 is intended to deliver a single time, an order to initialize the process. In the particular case of tomodensitometric image reconstruction, all these data $b_1$ are In accordance with the invention and by way of indication, it may be necessary to process 8192 data in the case of the argument A1 and 512×512 data in the case of the argument A2 and R in the case of reconstruction of high-definition tomodensitometric images. In the case of each value, the elementary time-duration is equal to a large number of elementary cycles.

What is claimed is:

1. A digital data processing and storage system, for use in processing data for producing tomodensitometric images on an imaging device, comprising:
   a central processing unit (8);
   an input/output device (7) connected to said central processing unit (8) for transmitting input data thereto;
   an arithmetic/logic unit (1) within said central processing unit (8) for receiving said data and having means for performing first arithmetic functions thereon to form, in a first step, intermediate periodic results in accordance with said data;
   a first microprogram sequencer (15,150) within said central processing unit (8), connected to said arithmetic/logic unit (1) for controlling said functions;
   an intelligent memory (100) connected with said central processing unit (8) for receiving therefrom said periodic results, and a control device (9) connected between said central processing unit (8) and said intelligent memory (100) for controlling and initializing said memory (100);
   said intelligent memory (100) comprising a conventional storage memory (10), at least one auxiliary processing unit (101) connected with said central processing unit (8) to receive said intermediate periodic results therefrom and for performing, in a second step, arithmetic/logic functions with said periodic results so as to produce image reconstruction signals, whereby said central processing unit (8) is relieved of some of said functions, and a second microprogram sequencer (115,1150) connected to said auxiliary processing unit (101) to control the operations thereof;
   whereby said auxiliary processing unit (101) operates on said periodic results and the contents of said memory (10); and means for initializing said second microprogram sequencer (115,1150) and thereafter operating at a rate determined by the input to said intelligent memory (100) of said periodic results.

2. The system according to claim 1 wherein said auxiliary processing unit is an adder for carrying out an accumulation of said periodic results.

3. The system according to claim 1, wherein said intelligent memory (100, 1000) comprises
   a plurality of pages (110, 120, 130, 140, . . . ), and a plurality of auxiliary processing units (111, 112, 113, 114, . . . ), each of them being respectively connected to one of said pages, for carrying out an interlace image reconstruction calculation.

4. The system according to claim 2, wherein said intelligent memory (100, 1000) comprises
   a plurality of pages (110, 120, 130, 140, . . . ), and a plurality of auxiliary processing units (111, 112, 113, 114, . . . ), each of them being respectively connected to one of said pages, for carrying out an interlace image reconstruction calculation.

5. A digital data processing and storage system, for use in expediting processing of data for producing images in a computerized tomographic scanner, comprising:
   a central processing unit (CPU) (8);
   an input/output device (7) connected to said CPU (8) for transmitting input data thereto;
   an arithmetic/logic unit (1) within said CPU (8) for receiving said data and having means for performing first arithmetic functions thereon to form, in a first step, intermediate periodic results in accordance with said data;
   a first microprogram sequencer (15,150) within said central processing unit (8), connected to said arithmetic/logic unit (1) for controlling said functions;
   an intelligent memory (100) connected with said central processing unit (8) for receiving therefrom said periodic results, and a control device (9) connected between said central processing unit (8) and said intelligent memory (100) for controlling and initializing said memory (100);
   said intelligent memory (100) comprising a multipage storage memory (10), a plurality of auxiliary processing units (110, 120, 130, 140, . . . ), each connected to a page (111, 112, 113, 114, . . . ) of said memory (10) and connected with said central processing unit (8) to receive said intermediate periodic results therefrom and for performing, in a second step, arithmetic/logic functions with said periodic results so as to accumulate data values in said memory representative of luminosity of pixels of a tomographic image of a section through a human body, whereby said central processing unit (8) is relieved of said functions; and a second microprogram sequencer (115,1150) connected to said auxiliary processing units to control the operation thereof;
   whereby said auxiliary processing units operate on said periodic results and iteratively on the contents of said memory (10); and means (9, 14) for initializing said memory (10) and said second microprogram sequencer (115,1150) and thereafter operating at a rate determined by the input to said intelligent memory (100) of said periodic results.

* * * * *